US008838949B2

(12) United States Patent
Gupta et al.

(10) Patent No.: US 8,838,949 B2
(45) Date of Patent: Sep. 16, 2014

(54) DIRECT SCATTER LOADING OF EXECUTABLE SOFTWARE IMAGE FROM A PRIMARY PROCESSOR TO ONE OR MORE SECONDARY PROCESSOR IN A MULTI-PROCESSOR SYSTEM

(75) Inventors: Nitin Gupta, San Diego, CA (US);
Daniel H. Kim, San Diego, CA (US);
Igor Malamant, San Diego, CA (US);
Steve Haehnichen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 13/052,516

(22) Filed: Mar. 21, 2011

(65) Prior Publication Data

US 2012/0072710 A1    Mar. 22, 2012

Related U.S. Application Data

(60) Provisional application No. 61/324,035, filed on Apr. 14, 2010, provisional application No. 61/316,369, filed on Mar. 22, 2010, provisional application No. 61/324,122, filed on Apr. 14, 2010, provisional application No. 61/325,519, filed on Apr. 19, 2010.

(51) Int. Cl.
*G06F 15/177*    (2006.01)
*G06F 9/445*    (2006.01)
*G06F 9/44*    (2006.01)

(52) U.S. Cl.
CPC .............. *G06F 15/177* (2013.01); *G06F 9/445* (2013.01); *G06F 9/4405* (2013.01)
USPC .............. 713/2; 713/1; 713/100; 712/E9.003; 712/30

(58) Field of Classification Search
CPC ...... G06F 9/4405; G06F 9/445; G06F 15/177
USPC ...................... 713/1, 2, 100; 712/E9.003, 30
See application file for complete search history.

(56) References Cited

U.S. PATENT DOCUMENTS

| 5,978,589 | A | 11/1999 | Yoon |
| 6,079,017 | A | 6/2000 | Han et al. |
| 7,447,846 | B2 | 11/2008 | Yeh |

(Continued)

FOREIGN PATENT DOCUMENTS

| EP | 2034416 A1 | 3/2009 |
| JP | S63233460 A | 9/1988 |

(Continued)

OTHER PUBLICATIONS

International Search Report and Written Opinion—PCT/US2011/029484—ISA/EPO—May 30, 2011.

*Primary Examiner* — M Elamin
(74) *Attorney, Agent, or Firm* — Peter Michael Kamarchik; Nicholas J. Pauley; Joseph Agusta

(57) ABSTRACT

In a multi-processor system, an executable software image including an image header and a segmented data image is scatter loaded from a first processor to a second processor. The image header contains the target locations for the data image segments to be scatter loaded into memory of the second processor. Once the image header has been processed, the data segments may be directly loaded into the memory of the second processor without further CPU involvement from the second processor.

23 Claims, 5 Drawing Sheets

(56) References Cited

U.S. PATENT DOCUMENTS

| | | |
|---|---|---|
| 7,765,391 B2 | 7/2010 | Uemura et al. |
| 2002/0138156 A1 | 9/2002 | Wong et al. |
| 2009/0204751 A1 | 8/2009 | Kushita |
| 2010/0077130 A1 | 3/2010 | Kwon |
| 2011/0035575 A1* | 2/2011 | Kwon .................. 713/2 |
| 2012/0089814 A1 | 4/2012 | Gupta et al. |

FOREIGN PATENT DOCUMENTS

| | | |
|---|---|---|
| JP | H06195310 A | 7/1994 |
| JP | H08161283 A | 6/1996 |
| JP | H09244902 A | 9/1997 |
| JP | 2000020492 A | 1/2000 |
| JP | 2004086447 A | 3/2004 |
| JP | 2004252990 A | 9/2004 |
| JP | 2005122759 A | 5/2005 |
| JP | 2007157150 A | 6/2007 |
| KR | 20070097538 A | 10/2007 |
| WO | WO2006077068 A2 | 7/2006 |
| WO | 2008001671 A1 | 1/2008 |
| WO | 2011119648 A1 | 9/2011 |

* cited by examiner

DIRECT SCATTER LOADING OF EXECUTABLE SOFTWARE IMAGE FROM A PRIMARY PROCESSOR TO ONE OR MORE SECONDARY PROCESSOR IN A MULTI-PROCESSOR SYSTEM

CROSS REFERENCE TO RELATED APPLICATIONS

This application claims the benefit of U.S. provisional patent application No. 61/316,369 filed Mar. 22, 2010, in the names of MALAMANT et al., U.S. provisional patent application No. 61/324,035 filed Apr. 14, 2010, in the names of GUPTA et al., U.S. provisional patent application No. 61/324,122 filed Apr. 14, 2010, in the names of GUPTA et al., and U.S. provisional patent application No. 61/325,519 filed Apr. 19, 2010, in the names of GUPTA et al., the disclosures of which are expressly incorporated herein by reference in their entireties.

TECHNICAL FIELD

The following description relates generally to multi-processor systems, and more specifically to multi-processor systems in which a primary processor is coupled to a non-volatile memory storing executable software image(s) of one or more other processors (referred to herein as "secondary" processors) system which are each coupled to a dedicated volatile memory, wherein the executable software images are efficiently communicated from the primary processor to the secondary processor(s) in a segmented format (e.g., using a direct scatter load process).

BACKGROUND

Processors execute software code to perform operations. Processors may require some software code, commonly referred to as boot code, to be executed for hooting up. In a multi-processor system, each processor may require respective boot code for booting up. As an example, in a smartphone device that includes an application processor and a modem processor, each of the processors may have respective boot code for booting up.

A problem exists on a significant number of devices (such as smart phones) that incorporate multiple processors (e.g., a standalone application processor chip integrated with a separate modem processor chip). A flash/non-volatile memory component may be used for each of the processors, because each processor has non-volatile memory (e.g., persistent storage) of executable images and file systems. For instance, a processor's boot code may be stored to the processor's respective non-volatile memory (e.g., Flash memory, read-only memory (ROM), etc.), and upon power-up the boot code software is loaded for execution by the processor from its respective non-volatile memory. Thus, in this type of architecture the executable software, such as a processor's boot code, is not required to be loaded to the processor from another processor in the system.

Adding dedicated non-volatile memory to each processor, however, occupies more circuit board space, thereby increasing the circuit board size. Some designs may use a combined chip for Random Access Memory (RAM) and Flash memory (where RAM and Flash devices are stacked as one package to reduce size) to reduce board size. While multi-chip package solutions do reduce the needed circuit board foot print to some extent, it may increase costs.

In some multi-processor systems, software may be required to be loaded to one processor from another processor. For example, suppose a first processor in a multi-processor system is responsible for storing to its non-volatile memory boot code for one or more other processors in the system; wherein upon power-up the first processor is tasked with loading the respective boot code to the other processor(s), as opposed to such boot code residing in non-volatile memory of the other processor(s). In this type of system, the software (e.g., boot image) is downloaded from the first processor to the other processor(s) (e.g., to volatile memory of the other processor(s)), and thereafter the receiving processor(s) boots with the downloaded image.

Often, the software image to be loaded is a binary multi-segmented image. For instance, the software image may include a header followed by multiple segments of code. When software images are loaded, from an external device (e.g., from another processor) onto a target device (e.g., a target processor) there may be an intermediate step where the binary multi-segmented image is transferred into the system memory and then later transferred into target locations by the boot loader.

In a system in Which the software image is loaded onto a target "secondary" processor from a first "primary" processor, one way of performing such loading is to allocate a temporary buffer into which each packet is received, and each packet would have an associated packet header information along with the payload. The payload in this case would be the actual image data. From the temporary buffer, some of the processing may be done over the payload, and then the payload would get copied over to the final destination. The temporary buffer would be some place in system memory, such as in internal random-access-memory (RAM) or double data rate (DDR) memory, for example.

Thus, where an intermediate buffer is used, the data being downloaded from a primary processor to a secondary processor is copied into the intermediate buffer. In this way, the buffer is used to receive part of the image data from the primary processor, and from the buffer the image data may be scattered into the memory (e.g., volatile memory) of the secondary processor.

The primary processor and its non-volatile memory that stores the boot image for a secondary processor may be implemented on a different chip than a chip on which the secondary processor is implemented. Thus, in order to transfer the data from the primary processor's non-volatile memory to the secondary processor (e.g., to the secondary processor's volatile memory), a packet-based communication may be employed, wherein a packet header is included in each packet communicated to the secondary processor. The packets are stored in an intermediate buffer, and some processing of the received packets is then required for that data to be stored where it needs to go (e.g., within the secondary processor's volatile memory).

SUMMARY

A multi-processor system is offered. The system includes a secondary processor having a system memory and a hardware buffer for receiving at a least a portion of an executable software image. The secondary processor includes a scatter loader controller for loading the executable software image directly from the hardware buffer to the system memory. The system also includes a primary processor coupled with a memory. The memory stores the executable software image for the secondary processor. The system further includes an interface communicatively coupling the primary processor and the secondary processor via which the executable software image is received by the secondary processor.

A method is also offered. The method includes receiving at a secondary processor, from a primary processor via an inter-chip communication bus, an image header for an executable software image for the secondary processor that is stored in memory coupled to the primary processor. The executable software image includes the image header and at least one data segment. The method also includes processing, by the secondary processor, the image header to determine at least one location within system memory to which the secondary processor is coupled to store the at least one data segment. The method also includes receiving at the secondary processor, from the primary processor via the inter-chip communication bus, the at least one data segment. Still further, the method includes loading, by the secondary processor, the at least one data segment directly to the determined at least one location within the system memory.

An apparatus is offered. The apparatus includes means for receiving at a secondary processor, from a primary processor via an inter-chip communication bus, an image header for an executable software image for the secondary processor that is stored in memory coupled to the primary processor. The executable software image includes the image header and at least one data segment. The apparatus also includes means for processing, by the secondary processor, the image header to determine at least one location within system memory to which the secondary processor is coupled to store the at least one data segment. The apparatus further includes means for receiving at the secondary processor, from the primary processor via the inter-chip communication bus, the at least one data segment. Still further, the apparatus includes means for loading, by the secondary processor, the at least one data segment directly to the determined at least one location within the system memory.

A multi-processor system is offered. The system includes a primary processor coupled with a first non-volatile memory. The first non-volatile memory is coupled exclusively to the primary processor and stores a file system for the primary processor and executable images for the primary processor and secondary processor. The system also includes a secondary processor coupled with a second non-volatile memory. The second non-volatile memory is coupled exclusively to the secondary processor and stores configuration parameters and file system for the secondary processor. The system farther includes an interface communicatively coupling the primary processor and the secondary processor via which an executable software image is received by the secondary processor.

A multi-processor system is offered. The system includes a primary processor coupled with a first non-volatile memory. The first non-volatile memory is coupled exclusively to the primary processor and stores executable images and file systems for the primary and secondary processors. The system also includes a secondary processor. The system further includes an interface communicatively coupling the primary processor and the secondary processor via which an executable software image is received by the secondary processor.

A method is offered. The method includes sending, from a memory coupled to a primary processor, an executable software image for a secondary processor. The executable software image is sent via an interface communicatively coupling the primary processor and secondary processor. The method also includes receiving, at the secondary processor, the executable software image. The method further includes executing, at the secondary processor, the executable software image.

BRIEF DESCRIPTION OF THE DRAWINGS

For a more complete understanding of the present teachings, reference is now made to the following description taken in conjunction with the accompanying drawings.

DETAILED DESCRIPTION

The word "exemplary" is used herein to mean "serving as an example, instance, or illustration." Any aspect described herein as "exemplary" is not necessarily to be construed as preferred or advantageous over other aspects.

Certain aspects disclosed herein concern multi-processor systems where one primary processor is connected to a non-volatile memory storing executable images of one or more other processors (referred to herein as "secondary" processors) in the system. In such a multi-processor system each of the secondary processors may be connected to a dedicated volatile memory used for storing executable images, run-time data, and optionally a file system mirror.

Executable images are often stored in a segmented format where each segment can be loaded into a different memory region. Target memory locations of executable segments may or may not be contiguous with respect to each other. One example of a multi-segmented image format is Executable and Linking Format (ELF) which allows an executable image to be broken into multiple segments and each one of these segments may be loaded into different system memory locations.

In one exemplary aspect a direct scatter load technique is disclosed for loading a segmented image from a primary processor's non-volatile memory to a secondary processor's volatile memory. As discussed further below, the direct scatter load technique avoids use of a temporary buffer. For instance, in one aspect, rather than employing a packet-based communication in which the image is communicated via packets that each include a respective header, the raw image data is loaded from the primary processor to the secondary processor. In another aspect, headers are used which include information used to determine the target location information for the data.

Figure 1:
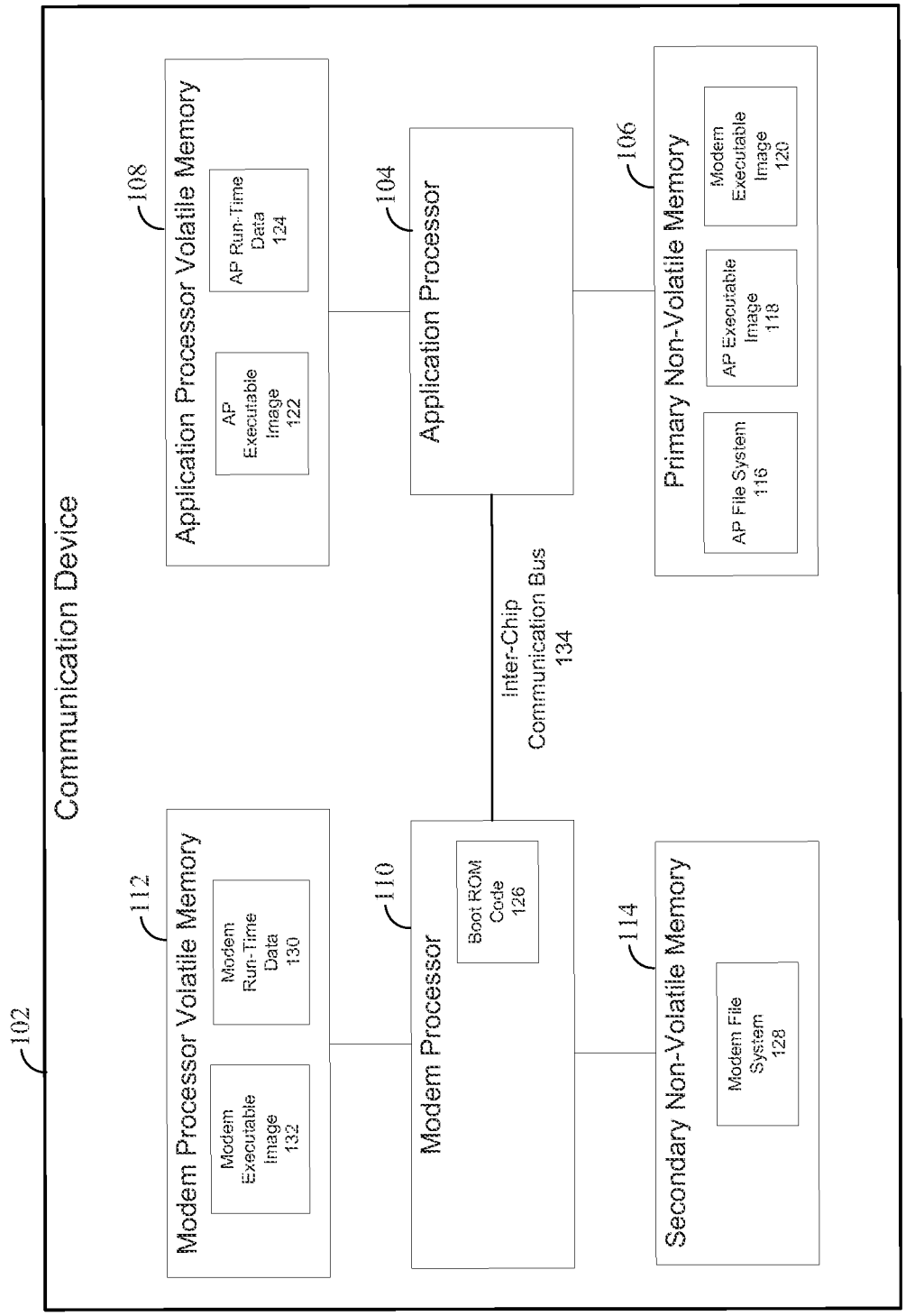
FIG. 1 is an illustration of an exemplary device within which aspects of the present disclosure may be implemented.

Exemplary Multi-Processor Architecture with Centralized Non-Volatile Memory—with Reduced Localized Non-Volatile Memory for File System FIG. 1 illustrates a block diagram of a first multi-processor architecture 102 in which a primary processor (application processor 104) hosts a primary (large) nonvolatile memory 106 (e.g., NAND flash memory) while a second processor (e.g., modem processor 110) has a secondary (reduced or minimal) non-volatile memory 114 (e.g., NOR flash memory).

In the communication device architecture 102, the application processor 104 is coupled to a primary non-volatile memory 106 and an application processor volatile memory 108 (e.g., random access memory). The modem processor 110 is coupled to a secondary non-volatile memory 114 and a modem processor volatile memory 112. An inter-processor communication bus 134 allows communications between the application processor 104 and the modem processor 110.

A modem executable image 120 for the modem processor 110 may be stored in the application processor (AP) non-volatile memory 106 together with the AP executable image 118 and the AP file system 116. The application processor 104 may load its AP executable image 118 into the application processor volatile memory 108 and store it as AP executable image 122. The application processor volatile memory 108 may also serve to store AP run-time data 124.

The modem processor 110 has the dedicated secondary reduced or minimal) non-volatile memory 114 (e.g., NOR flash) for its file system 128 storage. This secondary (reduced or minimal) non-volatile memory 114 is smaller and lower cost than a flash device capable of storing both the run-time modem executable images 120 and the file system 128.

Upon system power-up, the modem processor 110 executes its primary boot loader (PBL) from the hardware boot ROM 126 (small read-only on-chip memory). The modem PBL may be adapted to download the modem executables 120 from the application processor 104. That is, the modem executable image 120 (initially stored in the primary non-volatile memory 106) is requested by the modem processor 110 from the application processor 104. The application processor 104 retrieves the modem executable image 120 and provides it to the modem processor 110 via an inter-processor communication bus 134 (e.g., inter-chip communication bus). The modem processor 110 stores the modem executable image 132 directly into the modem processor RAM (Random Access Memory) 112 to the final destination without copying the data into a temporary buffer in the modem processor RAM 112. The inter-processor communication bus 134 may be, for example, a HSIC bus (USB-based High Speed Inter-Chip), an HSI bus (MIPI High Speed Synchronous Interface), a SDIO bus (Secure Digital I/O interface), a UART bus (Universal Asynchronous Receiver/Transmitter), an SPI bus (Serial Peripheral Interface), an I2C bus (Inter-Integrated Circuit), or any other hardware interface suitable for inter-chip communication available on both the modem processor 110 and the application processor 104.

Once the modem executable image 120 is downloaded into the modem processor RAM 112 and authenticated, it is maintained as a modem executable image 132. Additionally, the modem processor volatile memory 112 may also store modem run-time data 130. The modem Boot ROM code 126 may then jump into that modem executable image 132 and start executing the main modem program from the modem processor RAM 112. Any persistent (non-volatile) data, such as radio frequency (RF) calibration and system parameters, may be stored on the modem file system 128 using the secondary (reduced or minimal) non-volatile memory 114 attached to the modem processor 110.

Figure 2:
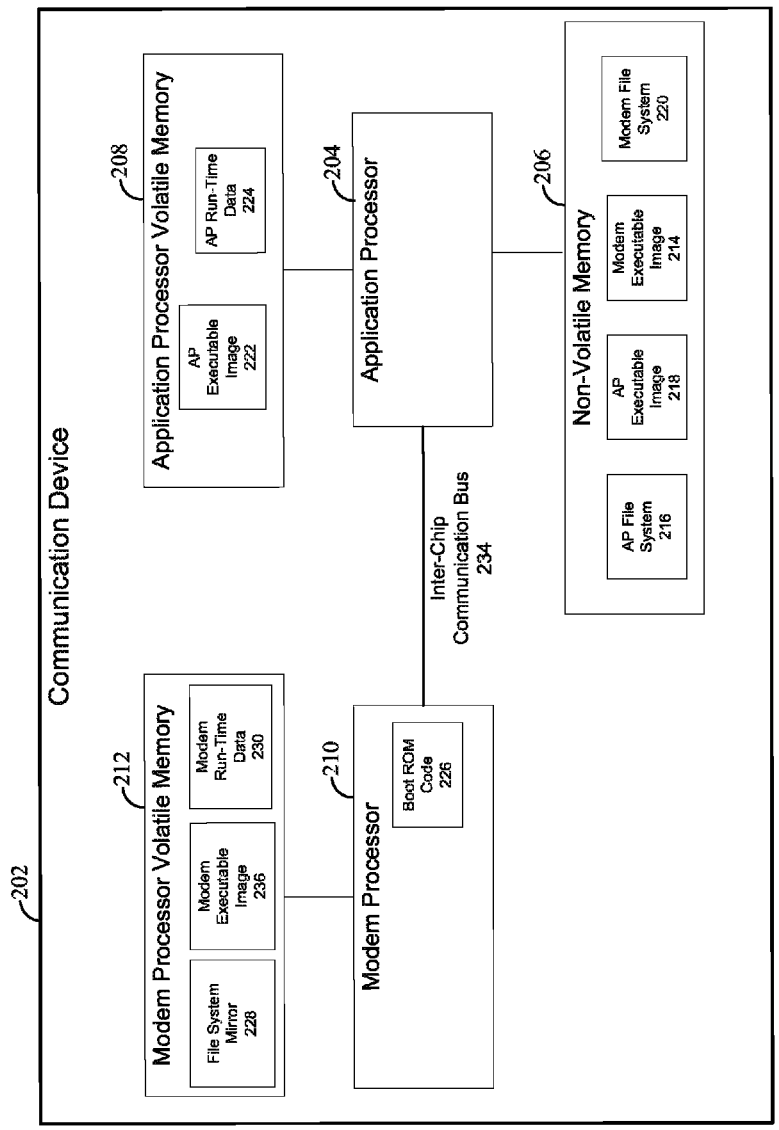
FIG. 2 is an illustration of an exemplary device within which aspects of the present disclosure may be implemented.

Exemplary Multi-Processor Architecture with Centralized Non-Volatile Memory—with No Localized Non-Volatile Memory for File Systems FIG. 2 illustrates a block diagram of a second multi-processor architecture 202 in which a primary processor (application processor 204) hosts a primary (large) non-volatile memory 206 (e.g., NAND flash memory). The primary non-volatile memory 206 may store a modem-executable image 214 and/or a modem file system 220 for the secondary processor (modem processor 210). The secondary processor (modem processor 210) may be configured to request the modem-executable image 214 and/or modem file system 220 from the primary processor 204. The primary processor 204 then retrieves the requested modem-executable image 214 and/or modem file system 220 from the non-volatile memory 206 and provides it to the secondary processor 210 via an inter-processor communication bus 234.

In this architecture 202, the application processor 204 is coupled to the non-volatile memory 206 and an application processor volatile memory 208 (e.g., random access memory). The modem processor 210 is coupled to a modem processor volatile memory 212 but does not have its own non-volatile memory. The modem processor volatile memory 212 stores a file system mirror 228, a modem executable image 236, and modem run-time data 230. The inter-processor communication bus 231 allows communications between the application processor 204 and modem processor 210.

All the executable images 214 and file system 220 for the modem processor 210 may be stored in the non-volatile memory 206 together with the AP executable image 218 and the AP file system 216. The application processor 204 may load its AP executable image 218 into the application processor volatile memory 208 and store it as AP executable image 222. The application processor volatile memory 208 may also serve to store AP run-time data 224. The modem file system may be encrypted with a modem processor's private key for privacy protection and prevention of subscriber identity cloning.

Upon system power-up, the modem Boot ROM code 226 downloads both the modem executable image 214 and the modem file system 220 from the application processor 204 into the modem processor volatile memory 212. During normal operation, any read accesses to the modem file system 228 are serviced from the modem processor volatile memory 212. Any write accesses are performed in the modem processor volatile memory 212 as well. In addition, there may be a background process running on the modem processor 210 and the application processor 204 to synchronize the contents of the File System 228 in modem processor volatile memory 212 with the modem file system 220 stored on the non-volatile memory 206.

The primary and secondary processors may periodically synchronize the file system in the volatile memory for the secondary processor with the corresponding file system in the primary non-volatile memory. The first write to the modem file system 228 may start a timer (for example, a ten minute timer) in the modem processor 210. While this timer is running, all writes to the file system 228 are coalesced into the modem processor volatile memory 212. Upon expiration of the timer, the modem processor 210 copies the file system image 228 from volatile memory 212, encrypts it, and alerts the application processor 204 that new data is available. The application processor 204 reads the encrypted copy and writes it to the non-volatile memory 206 into the modem file system 220. The application processor 204 then signals the modem processor 210 that the write operation is complete. If a synchronization operation fails, a present version of the modem file system may be used. Synchronization may occur periodically (for example, every ninety seconds) or after a certain time following a write operation by the modem to its file system. To prevent corruption from circumstances such as sudden power removal, two copies of the modem file system 220 may be stored.

The modem processor 210 may also initiate a "flush" operation of the file system mirror 228 to the application processor's non-volatile memory 206. This may occur for a number of reasons, including phone power-off, as well as sending an acknowledgement message to the network to indicate acceptance and storage of incoming SMS messages.

File system read operations on the modem processor 210 are serviced from the modem processor volatile memory 212, which reflects the current state of the modem file system. Because read operations are more frequent than write operations, and write operations tend to occur in "bursts" of activity, the overall system load and power consumption may be reduced.

The application processor 204, modem processor 210, and Hoot loader have specific measures in place to ensure that there is always at least one complete file system image available in the non-volatile memory 206 at all times. This provides immunity to power-loss or surprise-reset scenarios.

Application of the concepts disclosed herein are not limited, to the exemplary system shown above but may likewise be employed with various other multi-processor systems.

Zero Copy Transport flow

Aspects of the present disclosure provide techniques for efficiently loading the executable software images from the primary processor's non-volatile memory to the secondary processor's volatile memory. As mentioned above, traditional loading processes require an intermediate step where the binary multi-segmented image is buffered (e.g., transferred into the system memory) and then later scattered into target locations (e.g., by a boot loader). Aspects of the present disclosure provide techniques that alleviate the intermediate step of buffering required in traditional loading processes. Thus, aspects of the present disclosure avoid extra memory copy operations, thereby improving performance (e.g., reducing the time required to boot secondary processors in a multi-processor system).

As discussed further below, one exemplary aspect of the present disclosure employs a direct scatter load technique for loading the executable software images from the primary processor's non-volatile memory to the secondary processor's volatile memory. Certain aspects of the present disclosure also enable concurrent image transfers with post-transfer data processing, such as authentication, which may further improve efficiency, as discussed further below.

In one aspect, the host primary processor does not process or extract any information from the actual image data it simply sends the image data as "raw" data to the target, without any packet header attached to the packet. Because the target secondary processor initiates the data transfer request, it knows exactly how much data to receive. This enables the host to send data without a packet header, and the target to directly receive and store the data. In that aspect, the target requests data from the host as needed. The first data item it requests is the image header for a given image transfer. Once the target has processed the image header, it knows the location and size of each data segment in the image. The image header also specifies the destination address of the image in target memory. With this information, the target can request data from the host for each segment, and directly transfer the data to the appropriate location in target memory. The hardware controller for the inter-chip communication bus on the application processor may add its own low-level protocol headers, which would be processed and stripped by the modem processor. These low-level headers may be transparent to the software running on both processors.

Figure 3:
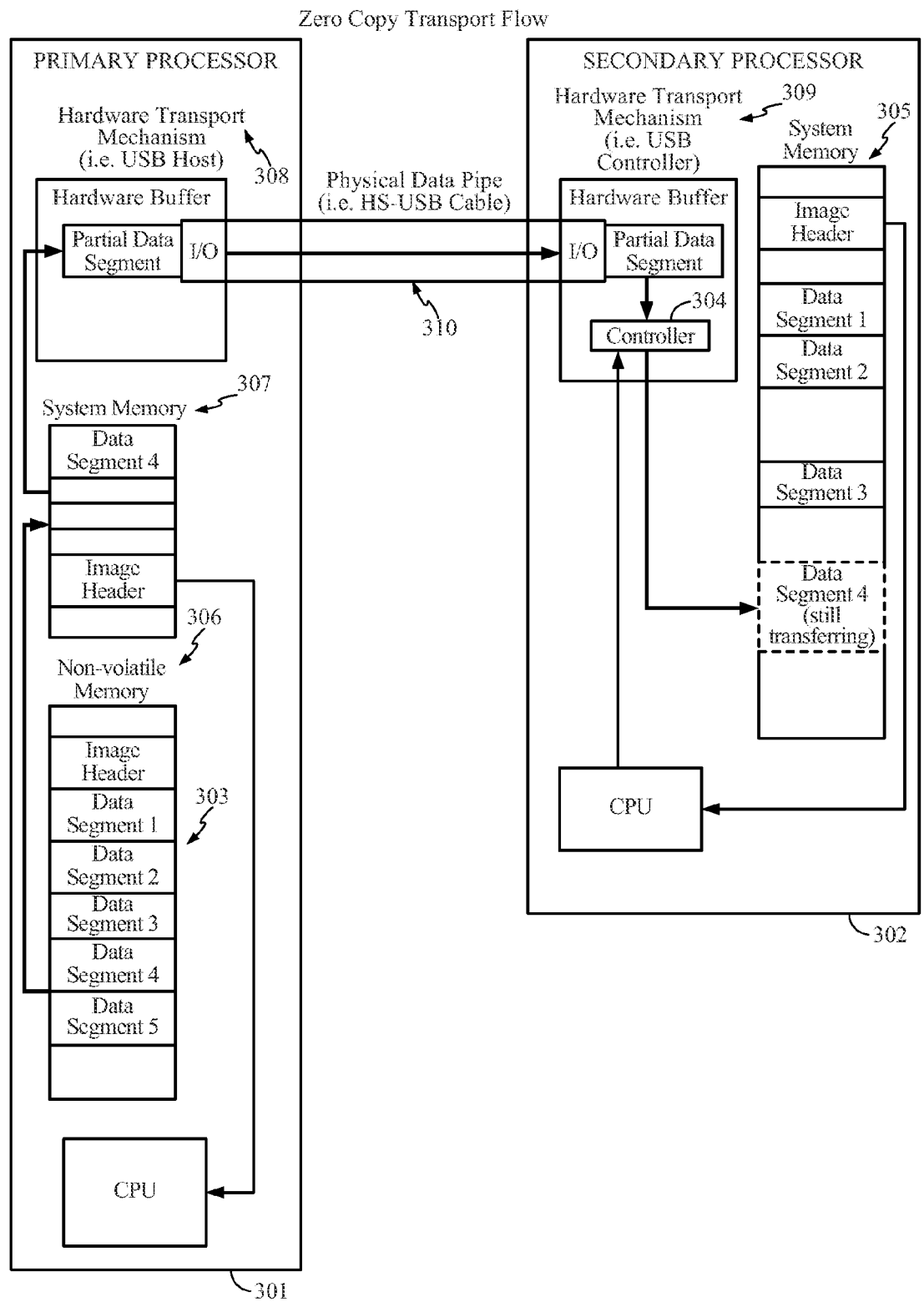
FIG. 3 is an illustration of an operational flow for an exemplary loading process for loading an executable image from a primary processor to a secondary processor according to one aspect of the present disclosure.

In one aspect of the present disclosure, the loading process is divided into two stages, as illustrated in the exemplary flow shown in FIG. 3. FIG. 3 shows a block diagram of a primary processor 301 (which may be the application processors 104 or 204 of FIG. 1 or 2 with their non-volatile memory 106 or 206) and a secondary processor 302 (which may be the modem processor 110 or 210 of FIG. 1 or 2 with their volatile memory 112 or 212). In FIG. 3, an exemplary software image for secondary processor 302 is stored to non-volatile memory of the primary processor 301. As shown in this example, the exemplary software image 303 is a multi-segment image that includes an image header portion and multiple data segments (shown as data segments 1-5 in this example). The primary processor 301 and secondary processor 302 may be located on different physical silicon chips (i.e. on a different chip package) or may be located on the same package.

In the first stage of the exemplary loading process of FIG. 3, the image header information is transferred to the secondary processor 302. The primary processor 301 retrieves the data image segments, beginning with the image header, from non-volatile memory of the primary processor 306. The primary processor 301 parses the image header to load individual image segments from non-volatile memory of the primary processor 306 to system memory of the primary processor 307. The image header includes information used to identify where the modem image executable data is to be eventually placed into the system memory of the secondary processor 305. The header information is used by the secondary processor 302 to program the scatter loader/direct memory access controller 304 receive address when receiving the actual executable data. Data segments are then sent from system memory 307 to the primary hardware transport mechanism 308. The segments are then sent from the hardware transport mechanism 308 of the primary processor 301 to a hardware transport mechanism 309 of the secondary processor 302 over an inter-chip communication bus 310 (e.g., a HS-USB cable.) The first segment transferred may be the image header, which contains information used by the secondary processor to locate the data segments into target locations in the system memory of the secondary processor 305. The image header may include information used to determine the target location information for the data.

In one aspect, the target locations are not predetermined, but rather are determined by software executing in the secondary processor as part of the scatter loading process. Information from the image header may be used to determine the target locations. In this aspect the secondary processor's boot loader first requests the image header from the primary processor (the primary processor CPU does not process the image header at all). The secondary processor knows how the data segments are laid out in the non-volatile memory by looking at the image header (besides the RAM address/size, the header also includes the relative locations in non-volatile memory with respect to the start of the image file for each segment). Subsequent requests for the data segments are driven by the secondary processor.

In another aspect the primary processor may indicate where to put the segments in the secondary processor's volatile memory by parsing the image header and then programming the secondary processor's controller to place the following data segments in the specified address dictated in the image header. This may involve extra hardware to allow this external control of the secondary processor's controller.

The image header generally includes a list of segment start addresses and sizes defining where each of the segments should be loaded in the secondary processor's system memory 305. Secondary processor 302 includes a hardware transport mechanism 309 (e.g., a USB controller) that includes a scatter loader controller 304. In the second stage of the loading process, the boot loader programs the inter-chip connection controller's engine to receive incoming data and scatter load it into the secondary processor's corresponding target memory regions 305 according to the header information received in the first stage.

In case of USB or HSIC bus, each segment of the image may be transferred as a single USB transfer on the inter-chip communication bus 310. Knowing the size of the segment and the destination address allows the software to program the scatter loader controller 304 of the secondary processor 302 for the transfer of the entire segment directly into the target memory location (within system memory 305) with minimum software intervention by the secondary processor 302. This may result in an increased performance on the USB/HSIC bus when the segments are significantly large (e.g., over 1 megabyte (MB)).

As shown in FIG. 3, the image segments are not necessarily placed into consecutive locations within the secondary processor's system memory 305. Instead, the segments may be spread out in different locations of the memory. The exemplary loading process of FIG. 3 enables a copy of the secondary processor's software (i.e., the image 303) to be sent from the primary processor 301 directly to the final destination of segment on the secondary processor's system memory 305.

The image header is loaded from the primary processor 301 to scatter loader controller 304 of secondary processor 302. That image header provides information as to where the data segments are to be located in the system memory 305. The scatter loader controller 304 accordingly transfers the image segments directly into their respective target locations in the secondary processor's system memory 305. That is, once the secondary processor's CPU processes the image header in its memory 305 and programs the scatter loader controller 304, the scatter loader controller 304 knows exactly where the image segments need to go within the secondary processor's system memory 305, and thus the hardware scatter loader controller 304 is then programmed accordingly to transfer the data segments directly into their target destinations. In the example of FIG. 3, the scatter loader controller 304 receives the image segments and scatters them to different locations in the system memory 305. In one aspect, the executable software image is loaded into the system memory of the secondary processor without an entire executable software image being stored in the hardware buffer of the secondary processor.

Accordingly, no extra memory copy operations occur in the secondary processor in the above aspect. Thus, conventional techniques employing a temporary buffer for the entire image, and the packet header handling, etc., are bypassed in favor of a more efficient direct loading process. Thus, the exemplary load process of FIG. 3 does not require the intermediate buffer operations traditionally required for loading a software image from a primary processor to a secondary processor. Instead of scatter loading from a temporary buffer holding the entire image, the exemplary load process of FIG. 3 allows for direct scatter load the image segments to their respective target destinations directly from the hardware to the system memory. Once the image header is processed, the executable image is directly scatter loaded into target memory, bypassing farther CPU involvement.

Conventionally, when an external interface is involved (e.g., as is used in communicating image data from a primary processor to a secondary processor), some mechanism is required to transport that data so that both processors know what the actual data is and how to read the data. Often, the data to be transferred over an external interface is packetized with each packet including a header describing the data contained within the packet. For instance, in a transmission control protocol/internet protocol (TCP/IP) system where data is being transferred over a network, overhead associated with processing of packet headers arises.

In accordance with certain aspects of the present invention (e.g., as in the example of FIG. 3), the raw image data is transported. For instance, rather than transporting each segment of image data with a packet header, the exemplary load process of FIG. 3 determines the needed information about the data from the header associated with the entire image. Thus, the image header may be initially transferred, and all the processing for determining how to store the data to system memory 305 can occur before the transfer of the segments (based on the image header), and then the segments are transferred as raw data, rather than requiring processing of a packet-header for each segment as the segments are transferred. Thus, in the example of FIG. 3, the raw image data is being communicated from the primary processor to the secondary processor, and then handled by the hardware, which may strip off any USB packet headers, etc. In this exemplary aspect, there is no CPU processing done on the actual data segments, thereby improving efficiency of the load process.

When multiple images have to be loaded into the volatile memory of the same secondary processor, the above sequence of FIG. 3 may be repeated as many times as the number of images being transferred, in accordance with one aspect of the present disclosure. In certain aspects, within the primary processor 301, transfer from non-volatile memory to system memory may happen in parallel with sending data from the primary to secondary processor.

In one aspect, upon completion of each segment's transfer, the secondary processor 302 programs the scatter loader controller 304 to transfer the next segment and starts authentication of the segment that was just transferred. This enables the scatter loader controller 304 to transfer data while the secondary processor 302 performs the authentication. Authentication here refers generally to checking the integrity and authenticity of the received data. The details of the authentication mechanism are outside the scope of this disclosure, and any suitable authentication mechanism (including those well-known in the art) may be employed as may be desired in a given implementation. The above-mentioned parallelism can also apply to other post-transfer processing that may be desired to performed by the secondary processor 302 in a given implementation.

As soon as the last segment of the last image is transferred and authenticated, the secondary processor 302 may continue with the boot process and execute transferred images.

In one aspect, the modem (secondary) processor 110 executes a boot loader from an embedded boot read-only memory (ROM). In such an aspect, executing the boot ROM from the hardware eliminates the need for flash memory or devices on the modem side. The ROM code may be executed by the silicon itself.

Figure 4:
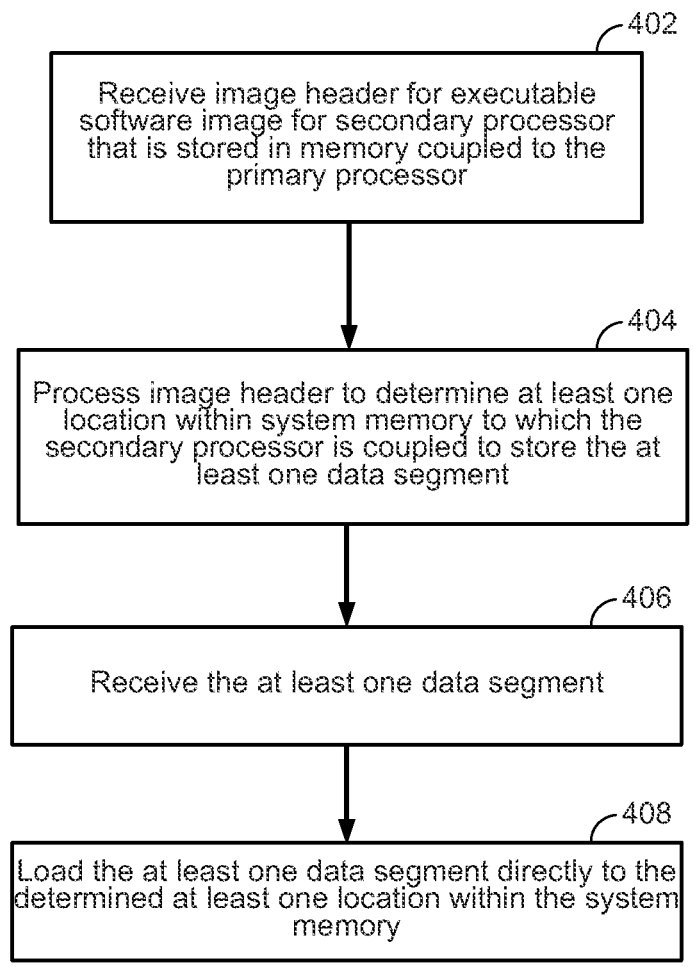
FIG. 4 is a flowchart illustrating a scatter loading method according to one aspect of the present disclosure.

FIG. 4 is a flowchart illustrating a scatter loading method according to one aspect of the present disclosure. As shown in block 402, a secondary processor receives, from a primary processor via an inter-chip communication bus, an image header for an executable software image for the secondary processor that is stored in memory coupled to the primary processor, the executable software image comprising the image header and at least one data segment. As shown in block 404, the secondary processor processes the image header to determine at least one location within system memory to which the secondary processor is coupled to store the at least one data segment. As shown in block 406, the secondary processor receives, from the primary processor via the inter-chip communication bus, the at least one data segment. As shown in block 408, the secondary processor loads the at least one data segment directly to the determined at least one location within the system memory.

In one aspect an apparatus includes means for receiving an executable image, means for processing an image header, means for receiving a data segment, and means for loading a data segment. These means may include a primary processor 301, secondary processor 302, inter-bus communication bus 310, memory 305 or 307, non-volatile memory 306, controller 304, or hardware transport mechanisms 308 or 309. In another aspect, the aforementioned means may be a module or any apparatus configured to perform the functions recited by the aforementioned means.

In view of the above, a secondary processor's software image may be loaded from a primary processor via interconnection bonds, like HS-USB or high speed interconnect, instead of loading the software image directly from non-volatile memory connected to the secondary processor. The secondary processor may not be directly connected to non-volatile memory. Thus, aspects of the present disclosure may reduce the time it takes to boot secondary processors in a multi-processor system where secondary processor images are transferred from the primary processor. This reduction is achieved by avoiding extra memory copy operations and enabling concurrent image transfers with background data processing, such as authentication.

Figure 5:
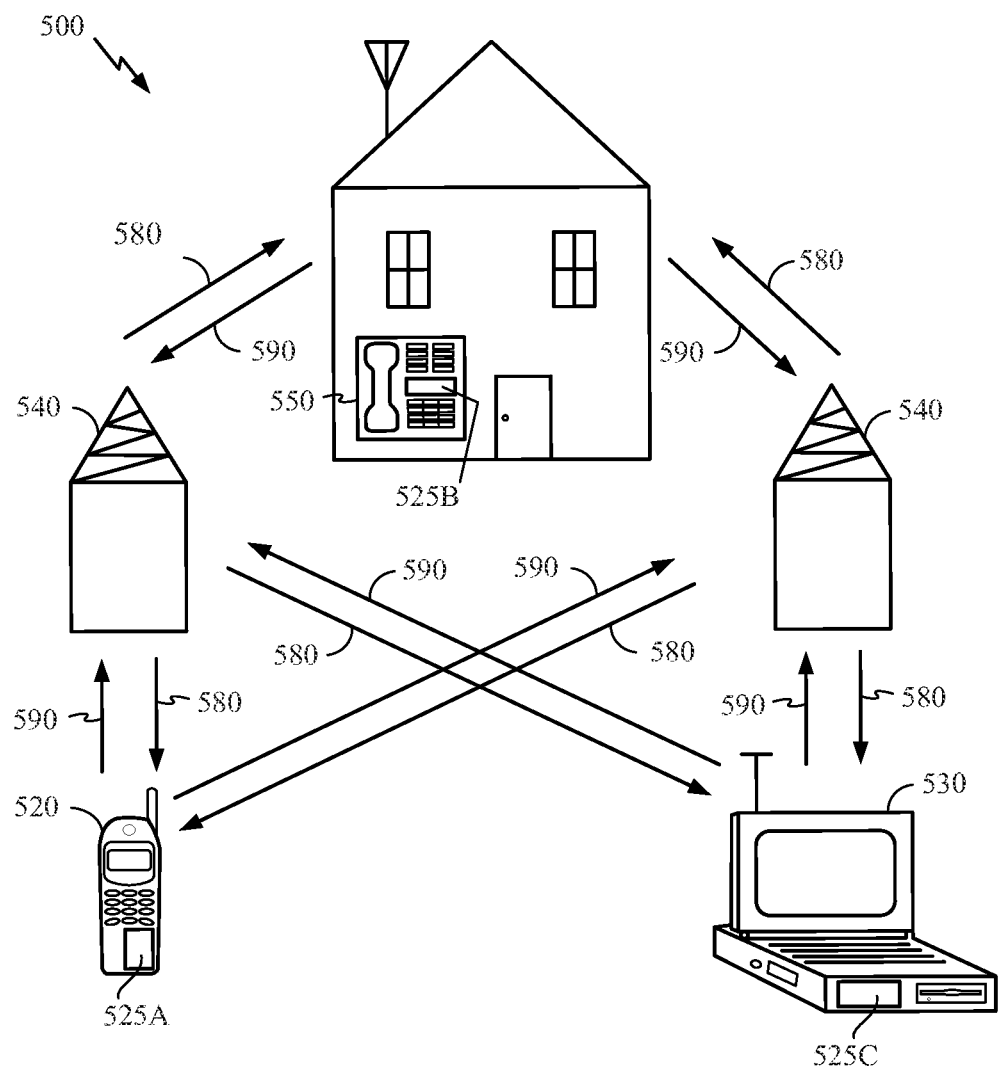
FIG. 5 is a block diagram showing an exemplary wireless communication system in which an embodiment of the disclosure may be advantageously employed.

FIG. 5 is a block diagram showing an exemplary wireless communication system 500 in which an embodiment of the disclosure may be advantageously employed. For purposes of illustration, FIG. 5 shows three remote units 520, 530, and 550 and two base stations 540. It will be recognized that wireless communication systems may have many more remote units and base stations. Remote units 520, 530, and 550 include IC devices 525A, 525C and 525B, that include the disclosed MRAM. It will be recognized that other devices may also include the disclosed MRAM, such as the base stations, switching devices, and network equipment. FIG. 5 shows forward link signals 580 from the base station 540 to the remote units 520, 530, and 550 and reverse link signals 590 from the remote units 520, 530, and 550 to base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 5 illustrates remote units according to the teachings of the disclosure, the disclosure is not limited to these exemplary illustrated units. Embodiments of the disclosure may be suitably employed in any device which includes MRAM.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it will be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized, according to the present disclosure. Accordingly, the appended claims are intended to include within their scope such processes, machines, manufacture, compositions of matter, means, methods, or steps.

What is claimed is:

1. A multi-processor system comprising:
   a secondary processor comprising:
      system memory and a hardware buffer for receiving an image header and at least one data segment of an executable software image, the image header and each data segment being received separately, and
      a scatter loader controller configured:
         to load the image header; and to scatter load each received data segment based at least in part on the loaded image header, directly from the hardware buffer to the system memory;

a primary processor coupled with a memory, the memory storing the executable software image for the secondary processor; and an interface communicatively coupling the primary processor and the secondary processor, the executable software image being received by the secondary processor via the interface.

2. The multi-processor system of claim 1 in which the scatter loader controller is configured to load the executable software image directly from the hardware buffer to the system memory of the secondary processor without copying data between system memory locations on the secondary processor.

3. The multi-processor system of claim 1 in which raw image data of the executable software image is received by the secondary processor via the interface.

4. The multi-processor system of claim 1 in which the secondary processor is configured to process the image header to determine at least one location within the system memory to store the at least one data segment.

5. The multi-processor system of claim 4 in which the secondary processor is configured to determine, based on the received image header, the at least one location within the system memory to store the at least one data segment before receiving the at least one data segment.

6. The multi-processor system of claim 1, in which the secondary processor further comprises a non-volatile memory storing a boot loader that initiates transfer of the executable software image for the secondary processor.

7. The multi-processor system of claim 1 in which the primary and secondary processors are located on different chips.

8. The multi-processor system of claim 1 in which the portion of the executable software image is loaded into the system memory of the secondary processor without an entire executable software image being stored in the hardware buffer.

9. The multi-processor system of claim 1 integrated into at least one of a mobile phone, a set top box, a music player, a video player, an entertainment unit, a navigation device, a computer, a hand-held personal communication systems (PCS) unit, a portable data unit, and a fixed location data unit.

10. A method comprising:

receiving at a secondary processor, from a primary processor via an inter-chip communication bus, an image header for an executable software image for the secondary processor that is stored in memory coupled to the primary processor, the executable software image comprising the image header and at least one data segment, the image header and each data segment being received separately;

processing, by the secondary processor, the image header to determine at least one location within system memory to which the secondary processor is coupled to store each data segment;

receiving at the secondary processor, from the primary processor via the inter-chip communication bus, each data segment; and scatter loading, by the secondary processor, each data segment reedy to the determined at least one location within the system memory, and each data segment being scatter loaded based at least in part on the processed image header.

11. The method of claim 10 further comprising booting the secondary processor using the executable software image.

12. The method of claim 10 further comprising loading the executable software image directly from a hardware buffer to the system memory of the secondary processor without copying data between system memory locations.

13. The method of claim 10 in which the processing occurs prior to the loading.

14. The method of claim 10 in which the primary and secondary processors are located on different chips.

15. The method of claim 10 further comprising performing the receiving, processing, and loading, in at least one of a mobile phone, a set top box, a music player, a video player, an entertainment unit, a navigation device, a computer, a hand-held personal communication systems (PCS) unit, a portable data unit, and a fixed location data unit.

16. An apparatus comprising:

means for receiving at a secondary processor, from a primary processor via an inter-chip communication bus, an image header for an executable software image for the secondary processor that is stored in memory coupled to the primary processor, the executable software image comprising the image header and at least one data segment, the image header and each data segment being received separately;

means for processing, by the secondary processor, the image header to determine at least one location within system memory to which the secondary processor is coupled to store each data segment;

means for receiving at the secondary processor, from the primary processor via the inter-chip communication bus, each data segment; and means for scatter loading, by the secondary processor, each data segment directly to the determined at least one location within the system memory, and each data segment being scatter loaded based at least in part on the processed image header.

17. The apparatus of claim 16 integrated into at least one of a mobile phone, a set top box, a music player, a video player, an entertainment unit, a navigation device, a computer, a hand-held personal communication systems (PCS) unit, a portable data unit, and a fixed location data unit.

18. A multi-processor system comprising:

a primary processor coupled with a first non-volatile memory, the first non-volatile memory coupled to the primary processor and storing a file system for the primary processor and executable images for the primary processor and secondary processor;

a secondary processor coupled with a second non-volatile memory, the second non-volatile memory coupled to the secondary processor and storing configuration parameters and file system for the secondary processor; and an interface communicatively coupling the primary processor and the secondary processor, an executable software image being received by the secondary processor via the interface, the executable software image comprising an image header and at least one data segment, the image header and each data segment being received separately, and the image header being used to scatter load each received data segment directly to a system memory of the secondary processor.

19. The multi-processor system of claim 18 integrated into at least one of a mobile phone, a set top box, a music player, a video player, an entertainment unit, a navigation device, a computer, a hand-held personal communication systems (PCS) unit, a portable data unit, and a fixed location data unit.

20. A multi-processor system comprising:
- a primary processor coupled with a first non-volatile memory, the first non-volatile memory coupled to the primary processor and storing executable images and file systems for the primary and secondary processors;
- a secondary processor not directly coupled to the first non-volatile memory; and
  - an interface communicatively coupling the primary processor and the secondary processor, an executable software image being is received by the secondary processor via the interface, the executable software image comprising an image header and at least one data segment, the image header and each data segment being received separately, and the image header being used to scatter load each received data segment directly to a system memory of the secondary processor.

21. The multi-processor system of claim 20 integrated into at least one of a mobile phone, a set top box, a music player, a video player, an entertainment unit, a navigation device, a computer, a hand-held personal communication systems (PCS) unit, a portable data unit, and a fixed location data unit.

22. A method comprising:
- sending, from a memory coupled to a primary processor, an executable software image for a secondary processor, via an interface communicatively coupling the primary processor and secondary processor, the executable software image comprising an image header and at least one data segment;
- receiving, at the secondary processor, the image header and each data segment of the executable software image, the image header and each data segment being received separately, and the image header being used to scatter load each received data segment directly to a system memory of the secondary processor; and
- executing, at the secondary processor, the executable software image.

23. The method of claim 22 further comprising performing the sending, receiving, and executing, in at least one of a mobile phone, a set top box, a music player, a video player, an entertainment unit, a navigation device, a computer, a hand-held personal communication systems (PCS) unit, a portable data unit, and a fixed location data unit.

* * * * *